United States Patent [11] 3,615,779

| | | | |
|---|---|---|---|
| [72] | Inventor | Helmut Von Freyhold | |
| | | Dusseldorf-Oberkassel, Germany | |
| [21] | Appl. No. | 28,225 | |
| [22] | Filed | Apr. 16, 1970 | |
| [45] | Patented | Oct. 26, 1971 | |
| [73] | Assignee | Henkel & Cie GmbH | |
| | | Dusseldorf-Holthausen, Germany | |
| [32] | Priority | Jan. 29, 1966 | |
| [33] | | Germany | |
| [31] | | H 58394 | |
| | | Continuation of application Ser. No. | |
| | | 612,098, Jan. 27, 1967, now abandoned. | |

[54] PROCESS FOR THE PROMOTION OF FLOW OF AQUEOUS INORGANIC SOLIDS DISPERSIONS
6 Claims, No Drawings

[52] U.S. Cl. .................................................. 106/74, 106/84, 106/308 B, 106/308 N, 252/352, 252/357
[51] Int. Cl. .................................................... B01f 17/20, B01f 17/54
[50] Field of Search .......................................... 106/38.35, 72, 74, 84, 288 B, 308 B, 308 N; 252/352, 357

[56] References Cited
UNITED STATES PATENTS

| 2,987,473 | 6/1961 | Millman et al. ............. | 210/57 |
|---|---|---|---|
| 3,341,340 | 9/1967 | Sawyer et al. ............. | 106/72 |
| 3,346,487 | 10/1967 | Irani et al. ................ | 252/8.5 |
| 3,346,488 | 10/1967 | Lyons et al. ............... | 252/8.5 |

Primary Examiner—James E. Poer
Attorney—Hammond & Lettell

ABSTRACT: A process for the promotion of the flow of aqueous inorganic solids dispersions using a mixture of at least one alkalisilicate and at least one water-soluble salt of an aminopolyphosphonic acid in proportions ranging from 20:1 to 2:1.

PROCESS FOR THE PROMOTION OF FLOW OF AQUEOUS INORGANIC SOLIDS DISPERSIONS

REFERENCE TO PRIOR APPLICATION

This application is a streamlined continuation of my prior, copending U.S. Pat. Application Ser. No. 612,098, filed Jan. 27, 1967, and now abandoned.

BACKGROUND OF THE INVENTION

It is desirable in many instances to effect a "liquefaction" of aqueous solids dispersions, such as sludges, silt, mud, slips (or slops), i.e., to lower the viscosity of the dispersion or else to reduce the water content while maintaining the original viscosity. The term "liquefaction" in the instant invention denotes an increased fluidity or deflocculation of the dispersions.

Processes of this kind find application e.g. for petroleum drilling liquids and muds, in the refining of kaolin and its fabrication, in ceramic slips (or slops), in crude concrete sludges, in sludges of montmorillonite or mica, or in aqueous pigment suspensions.

DESCRIPTION OF PRIOR ART

A number of additives have previously been suggested for these purposes; however, very few have actually been employed in practice. Numerous organic compounds had been proposed as additives to lower the viscosities of mortar-, concrete-, and cement mixtures, such as urea, lignin derivatives, phenolates, aminoacids, amines, aliphatic and aromatic oxycarboxylic acids, polybasic organic acids, or their salts. However, comparatively large quantities of these substances are required and they are not generally applicable for such liquefaction, but only for specific purposes.

Another group of liquefactors are the alkalisilicates, usually employed in mixture with soda or sodium hydroxide. The application of these products for siliceous sludges has the advantage that no alien substances are introduced into the dispersions. However, these compounds are unsatisfactory because of their high alkali content and exhibit undesirable side effects. For instance, they exert an unfavorable influence on the structure of the solids recovered from the dispersions and, in ceramic bodies, produce a so-called "alkali edge". Furthermore, clay-containing sludges tend toward high thixotropy upon deflocculation with silicates.

A further group of fluidity promoters consists of polyphosphates and organic phosphorus compounds, such as salts of the acylation products of phosphorous acid and aminomethylenephosphonic acids. These agents also have been found only partly satisfactory in practice. Since polyphosphates undergo hydrolysis in aqueous dispersions, their effectiveness decreases with the course of time, and a post set of the dispersions occurs. While the organic phosphorus compounds are free from this drawback, they exhibit to a very high degree another undesirable side effect which also is common to polyphosphates. This is that molds made of gypsum or plaster of Paris, generally used in practice, are badly attacked due to the strong dissolving capacity for alkaline earths, and are soon destroyed.

SUMMARY OF THE INVENTION

It is the object of the invention to improve the known agents for deflocculation and promotion of fluidity.

It has been found that a vast improvement can be attained when a mixture of at least one alkalisilicate and at least one water-soluble salt of an aminopolyphosphonic acid is incorporated in the aqueous inorganic solids dispersions in an amount of 0.01 to 0.8 weight percent, calculated on the aqueous dispersions. The aminopolyphosphonic acids have the general formula (1)

wherein $R_1$ and $R_2$ individually are selected from the radicals represented in formulas (2) or (3)

(1)

or 

(2)

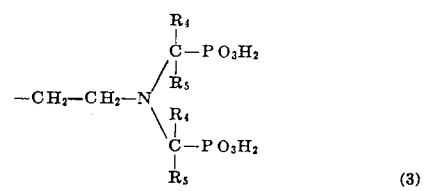

(3)

i.e., $R_1$ and $R_2$ may be alike or different; $R_3$ may be the same as $R_1$ or $R_2$ or else hydrogen, an alkyl or hydroxyalkyl having one to four carbon atoms.

The weight proportions of alkalisilicate to aminopolyphosphonic acid range from 20:1 to 2:1, preferably 10:1 to 3:1.

The preferred alkalisilicates are water-soluble sodium- or potassiumsilicates whose $Me_2O:Si_2$ weight proportions may vary from 1:0.5 to 1:4.4. The silicates can be applied in solution or as solids, and mixtures of different silicates may be employed.

The aminopolyphosphonic acids may, for instance, be aminotri-(ethylidenephosphonic acid), ethylenediaminotetra-(ethylidenephosphonic acid), aminotri-(propylidenephosphonic acid), aminotri-(isopropylenephosphonic acid), methylaminodi-(methylenephosphonic acid), porpylaminodi-(ethylidenephosphonic acid), monoethanolaminodi-(methylenephosphonic acid). Preferably, aminopolyphosphonic acids of the general formula (4) are used

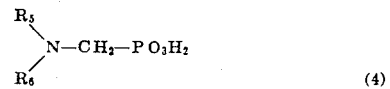

(4)

wherein $R_5$ and $R_6$ individually are radicals having the formulas (5) and (6)

and $-CH_2-PO_3H_2$ (5)

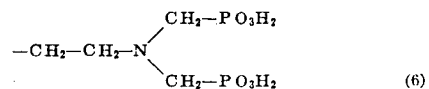

(6)

such as aminotri-(methylenephosphonic acid), ethylenediaminotetra-(methylenephosphonic acid) and diethylenetriaminopenta-(methylene-phosphonic acid).

Very good results are obtained in particular with aminotri-(methylenephosphonic acid) which is readily available. In lieu of single acids, mixtures of several aminopolyphosphonic acids may be employed.

The aminopolyphosphonic acids are applied in the form of their water-soluble salts, preferably their alkali salts. Especially suited are the sodium and potassium salts. In lieu of the salts, the free acids can be used with addition of a corresponding quantity of alkali.

The mixtures according to the invention are added to the dispersions to be liquefied in quantities of 0.01 to 0.8 weight percent, preferably 0.05 to 0.5 percent. The amount depends upon the kind of dispersion and the desired decrease in its viscosity, or the lowering of the water content, respectively.

In most instances, viscosity limits are present which can be lowered only to a very slight extent even with considerably increased additive.

The mixtures of alkalisilicates and aminopolyphosphonic acids can be incorporated in the dispersions in solid form or as concentrated solutions. Especially advantageous is the use of crystallized homogeneous mixed products. These solid, hydrated mixed crystals are produced, e.g., from the concentrated solutions of the components or by allowing the dispersion of a corresponding anhydrous metasilicate in a concentrated aqueous solution of a salt of an aminopolyphosphonic acid to crystallize with formation of the corresponding hydrate of the silicate.

The mixtures according to the invention exhibit a synergistic action with respect to the liquefying effect. The undesired side effects of the silicates and those of the organic phosphorus compounds also are decreased considerably, alone by dint of the greatly diminished concentration, due to the increased efficiency. In addition, the attack of the aminopolyphosphonic acids on plaster molds is largely inhibited by the presence of the silicates. Due to the alkali stability of the mixtures according to the invention, the dispersions are stable over long periods of time without changes in viscosity. Surprisingly, the thixotropy at higher degrees of liquefaction also is greatly decreased as compared to the use of the single components.

The mixture according to the invention is superior to other liquefactors in its activity as will be shown below in the examples. Due to the great differences in the properties of the inorganic materials and the several dispersions, comparative experiments are valid only for like dispersions. The mixtures according to the invention yield great decreases in viscosity even in dispersions which are notoriously difficult to deflocculate or liquefy. The viscosities thus obtained remain stable over long periods of time.

DESCRIPTION OF PREFERRED EMBODIMENTS

The following Examples are presented as preferred embodiments of the invention. However, it should be understood that they are given merely by way of illustration, and not of limitation, and that changes in the details may be made without departing from the spirit of the invention.

The percentages and proportions are by weight. Temperatures are degrees centigrade. Viscosity measurements had been made with a Brookfield viscosimeter. The term "liquefier" denotes deflocculant or fluidity promoter.

EXAMPLE 1

To a finely ground clay mixture (pottery slop) of 70 percent solids and 30 percent water and of a viscosity of 22,000 centipoises (cps.), the following liquefiers according to the invention were added in the quantities named below:
a. A mixture of $Na_2SiO_3 \cdot 9\ H_2O$ and aminotri-(methylenephosphonic acid) pentasodium salt in proportions of 7.1:1.
b. Mixed crystals of anhydrous $Na_2SiO_3$, aminotri-(methylenephosphonic acid) pentasodium salt, and water in proportions of 41.5:14:58.5.
c. Mixed crystals of $Na_2SiO_3 \cdot 99H_2O$ and aminotri-(methylenephosphonic acid) pentasodium salt in proportions of 7.1:1, produced from waterglass (58°/60° Be), NaOH, water and aminotri-(methylenephosphonic acid).

These liquefiers were compared with the following materials according to the prior art:
d. $Na_2SiO_3 \cdot 9H_2O$.
e. Aminotri-(methylenephosphonic acid) pentasodium salt.
f. Mixture of $Na_2SiO_3 \cdot 9H_2O$ with the tetrasodium salt of hydroxyethanediphosphonic acid in proportions of 7.1:1.

The decreases in viscosity obtained with these substances in the amounts named are listed in table 1.

TABLE 1

| Kind of Liquefier | % Liquefier | | |
|---|---|---|---|
| | 0 | 0.1 | 0.125 |
| a | 22,000 cps. | 220 cps. | 120 cps. |
| b | 22,000 | 170 | 100 |
| c | 22,000 | 200 | 105 |
| d | 22,000 | — | 2,550 |
| e | 22,000 | 300 | 280 |
| f | 22,000 | 1,700 | 180 |

EXAMPLE 2

To a kaolin slip of 60 percent solids and 40 percent water and of a viscosity of 20,000 cps, the liquefiers listed below were added in the amounts named.
a. Mixture of $Na_2SiO_3 \cdot 9H_2O$ with aminotri-(methylenephosphonic acid) pentasodium salt in proportions of 7.1:1.
b. Mixture of $Na_2 93 \cdot 9H_2O$ with the tetrasodium salt of hydroxyethanediphosphonic acid in proportions of 7.1:1.
c. $Na_2SiO_3 \cdot 9H_2O$.

The viscosity decreases obtained therewith are listed in table 2.

TABLE 2

| Kind of Liquefier | %Liquefier | | | |
|---|---|---|---|---|
| | 0.05 | 0.10 | 0.125 | 0.20 |
| a | 14,750 cps. | 4,300 cps. | 2,750 cps. | 2,000 cps. |
| b | 16,000 | 5,500 | 4,200 | 2,800 |
| | 19,000 | — | 11,500 | 9,000 |

EXAMPLE 3

A clay sludge for high strength material which had exhibited good initial liquefaction with a number of conventional liquifiers, such as quebracho, metasilicate, waterglass/soda but which again increased considerably in viscosity within a few hours, was treated with 0.2 percent of a crystallizate of metasilicate and the pentasodium salt of aminotri-(methylenephosphonic acid) in proportions of 7:1. The initial viscosity of 25,000 cps. thereby was lowered to 1,200 cps. No rise in viscosity could be observed within 3 weeks.

EXAMPLE 4

A kaolin slip (Amberg kaolin) of 70 percent solids and 30 percent water was liquefied with a mixed crystallizate which had been produced as follows:

100 parts waterglass (58°/60°B Be, 27 % $SiO_2$, 18 % $Na_2O$), 24 parts NaOH and 21.4 parts water were homogenized with 48.6 parts of a 50 percent aqueous solution of ethylenediaminotetra-(methylene-phosphonic acid) at 40°. Upon cooling to room temperature a dry, grindable crystallizate formed.

Incorporation of 0.2 percent of this product to the slip named above lowered the viscosity from 24,000 cps. to 136 cps.

EXAMPLE 5

The kaolin slip described in the preceding example was treated by incorporating 0.2 percent of a mixed crystallizate of waterglass and the sodium salt of monoethanolaminodi-(methylene-phosphonic acid), prepared in the same manner as described in example 4. The viscosity decreased from 24,000 cps. to 1,132 cps.

EXAMPLE 6

By means of the mixture named below, added in amounts ranging from 0.1 to 0.3 percent, the same kaolin slip as described in example 4, was reduced in viscosity from 24,000 cps. to 120-1,200 cps.

a. Mixture of potassium waterglass 28°/30° Be (8.04 % $K_2O$, 20.38 % $SiO_2$) with the pentapotassium salt of aminotri-(methylenephosphonic acid) in proportions of 4:1 1.
b. Mixed crystallizate of $Na_2SiO_3 \cdot 9H_2O$ with the sodium salt of diethylenetriaminopenta-(menthylenephosphonic acid) in porportions of 6.6:1.
c. Mixture of $Na_2SiO_3 \cdot 9H_2O$ with sodium salt of aminotri-(isopropylenephosphonic acid) in proportions of 3.5:1.
d. Mixed crystallizate of $Na_2SiO_3 \cdot 9H_2O$ with the sodium salt of ethylenediaminatetra-(ethylidenephosphonic acid) in proportions of 9:1.

EXAMPLE 7

To a dispersion of fine calcium carbonate (whiting) of 50 percent solids content and 50 percent water, a mixed crystallizate as described in example 4 (substance A) was added in increasing amounts, and the viscosities measured.

For comparison, a mixture as shown as (f) in example 1 was added to the same dispersion, and the viscosities measured. The results are shown in table 3. The values listed therein are centipoises. The second mixture is substance B.

TABLE 3

| Substance | % Liquefier | | | | |
|---|---|---|---|---|---|
| | 0 | 0.1 | 0.3 | 0.4 | 0.5 |
| A | 6,560 | 3,250 | 2,350 | 632 | 248 |
| B | 6,560 | — | — | 1,440 | 708 |

I claim:

1. Flow promoters and viscosity depressants for aqueous inorganic solid dispersions consisting essentially of a mixture of at least one alkali silicate with at least one water-soluble salt selected from the group consisting of sodium and potassium salts of an aminopolyphosphonic acid having the formula

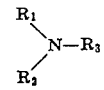

wherein $R_1$ and $R_2$ individually are selected from the group consisting of radicals having the formulae

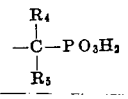

and

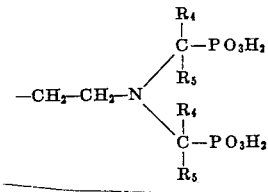

and wherein $R_3$ is selected from the group consisting of $R_1$, $R_2$, hydrogen, alkyl having one to four carbon atoms, and hydroxyalkyl having one to four carbon atoms; $R_4$ and $R_5$ individually having selected from the group consisting of hydrogen and alkyl having one to four carbon atoms; the proportion of said alkali silicate to said aminopolyphosphonic acid salt ranging from 20:1 to 2:1 by weight.

2. The flow promoters and viscosity depressants as defined in claim 1, wherein said alkali silicates are selected from the group consisting of water-soluble sodium and potassium silicates having weight proportions of alkali metal oxide to $SiO_2$ ranging from 1:0.5 to 1:4.4.

3. The flow promoters and viscosity depressants as defined in claim 1, wherein in said mixture said aminopolyphosphonic acid is selected from the group consisting of aminotri-(methylenephosphonic acid), ethylenediamino-tetra-(methylenephosphonic acid) and diethylene-triamino-penta-(methylenephosphonic acid).

4. The flow promoters and viscosity depressants as defined in claim 1, wherein said mixture is a solid hydrated mixed crystallizate of said alkali silicate with said salt of aminopolyphosphonic acid.

5. The flow promoters and viscosity depressants as defined in claim 1, wherein said aminopolyphosphonic acid is aminotri-(methylenephosphonic acid).

6. The flow promoters and viscosity depressants as defined in claim 1, wherein said mixture is a concentrated aqueous solution.

* * * * *